(12) United States Patent
Patrick et al.

(10) Patent No.: US 6,203,170 B1
(45) Date of Patent: Mar. 20, 2001

(54) FISH ATTRACTING OR REPELLING DEVICE COMPRISING DIODE ARRAY

(76) Inventors: Paul H. Patrick; Scott Poulton, both of 800 Kipling Avenue, Toronto (CA), M8Z 5S4

( * ) Notice: Subject to any disclaimer, the term of this patent is extended or adjusted under 35 U.S.C. 154(b) by 0 days.

(21) Appl. No.: 09/306,840

(22) Filed: May 7, 1999

(51) Int. Cl.[7] ............................. F21V 31/00; F21Y 101/02
(52) U.S. Cl. ........................ 362/234; 362/158; 362/230; 362/251; 362/800
(58) Field of Search ................................ 43/17.5; 362/96, 362/101, 158, 230, 231, 240, 249, 251, 252, 477, 800

(56) References Cited

U.S. PATENT DOCUMENTS

| | | | |
|---|---|---|---|
| 3,833,955 | * 9/1974 | Hulbert, Jr. | 362/96 |
| 4,553,194 | 11/1985 | Bailey | 362/267 |
| 5,003,719 | 4/1991 | Whitlock et al. | 43/17.5 |
| 5,036,615 | * 8/1991 | Lu | 43/17.5 |
| 5,119,578 | * 6/1992 | Johnson | 43/17.5 |
| 5,157,857 | * 10/1992 | Livingston | 43/17.5 |
| 5,299,107 | 3/1994 | Ratcliffe et al. | 362/158 |
| 5,388,253 | 2/1995 | Dolph | 362/154 |
| 5,471,821 | 12/1995 | Lindgren | 53/452 |
| 5,607,226 | * 3/1997 | Toth et al. | 362/251 |
| 5,890,794 | * 4/1999 | Abtahi et al. | 362/249 |
| 5,898,372 | * 4/1999 | Johnson et al. | 43/17.5 |

FOREIGN PATENT DOCUMENTS

| | | |
|---|---|---|
| 2 161 051 | 1/1986 | (GB) . |
| WO98/25450 | 6/1998 | (WO) . |

OTHER PUBLICATIONS

Lindgren–Pitman, Inc., LP Duralumes Commercial Light Stick, date unknown, 1 page.

Ontario Hydro, "Response of Fish to Light", Paul H. Patrick and G. L. Vascotto, Apr. 1991, pp. 252–260.

Int. Revue ges. Hydrobiol., "Attraction of Fish to Mercury Vapour Light and Its Application in a Generating Station Forebay", Gerard T. Haymes, Paul H. Patrick and Lawrence J. Onisto, 1984, pp. 867–876.

Int. Revue ges Hydrobiol., "Experimental Reduction of Fish Impingement by Artificial Illumination at Bergum Power Station", Rolf H. Hadderingh and N. V. Kema, 1982, pp. 887 and 889.

Aquaculture, Effects of fish size at harvest, initial stocking density and tank lighting conditions on the habituation of pond–reared yellow perch (*Perca flavescens*) to intensive culture conditions, Jeffrey A. Malison and James A. Held, vol. 104 (1992), p. 67.

Aquaculture Update, "Using Light to Harvest and Feed–train Fingerlings", vol. 2, No. 2, Summer 1994, 2 pages.

* cited by examiner

*Primary Examiner*—Alan Cariaso
(74) *Attorney, Agent, or Firm*—Ridout & Maybee

(57) ABSTRACT

A device for attracting and/or repelling fish comprises an array of visible light emitting diodes encased in a water resistant, protective housing which is substantially transparent to the visible light emitted by the diodes. In one preferred embodiment, a cylindrical housing containing the diode array is attached to a float, on the upper surface of which is provided a photovoltaic module which charges a battery located in a lower portion of the housing. In other preferred embodiments, the device is adapted to be submerged below the surface of a body of water and is connected to a remote power supply. The device is preferably used to attract fish, with the diodes emitting visible light in the green, blue and violet regions of the visible spectrum.

11 Claims, 11 Drawing Sheets

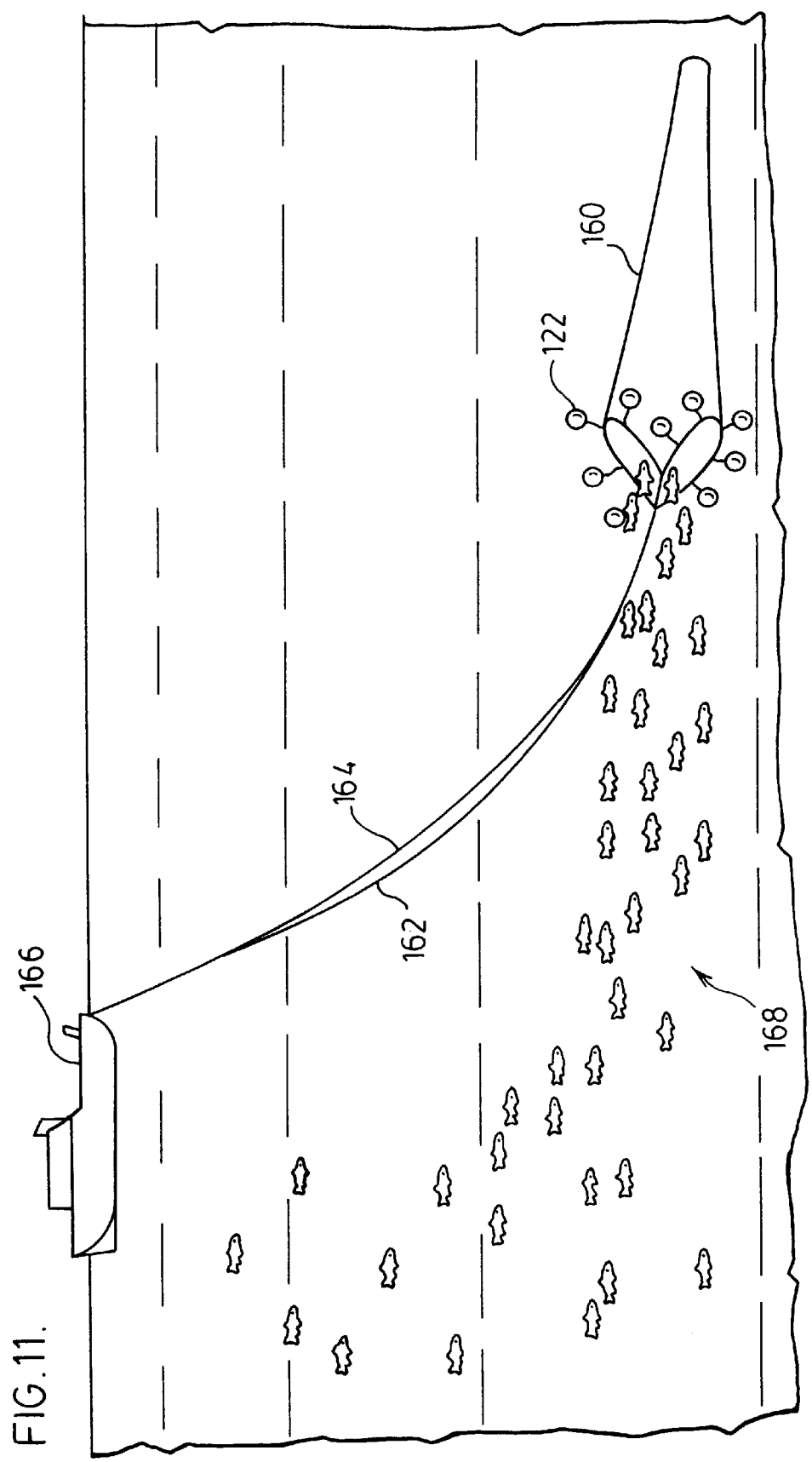

FISH ATTRACTING OR REPELLING DEVICE COMPRISING DIODE ARRAY

FIELD OF THE INVENTION

The present invention relates to illuminated devices for attracting or repelling fish, and more specifically to such devices which use an array of light emitting diodes as a light source.

BACKGROUND OF THE INVENTION

Fish are known to be attracted and repelled by light. This fact has been used to advantage in a number of devices for either attracting or repelling fish and thereby guiding their movements.

For example, International published application Serial No. WO/25450 (Baugher et al.) discloses a strobe light system with underwater flash heads for repelling and directing the movements of migrating fish away from turbine intakes and other danger points at dams, hydroelectric facilities, and water intakes in lakes and rivers. In order to deliver light of the appropriate intensity and wavelength, xenon tube flash heads are preferably employed by this system. Although xenon tube flash heads are durable and efficient, they generate large amounts of heat. In order to prevent premature failure due to excessive heat buildup, the Baugher et al. system employs a complex heat monitoring and dissipation system including temperature sensors, internal cooling fans and air circulation means, which adds to the complexity and cost of the system. Clearly, it would be advantageous to provide an underwater fish repelling or attracting system which does not generate large amounts of heat.

Light is also used to attract fish in the commercial fishing industry. In commercial fishing operations, illuminating devices are commonly attached to fishing nets in order to attract fish. One such device comprises a tubular, water-tight container which is easily attached to a net and contains two chemicals in chambers separated by a breakable barrier. When the barrier is disrupted, the chemicals react with one another to produce a phosphorescent light source. One such device, commonly referred to as a "glowstick", is sold by Lindgren-Pitman, Inc. under the trademark Duralumes. While this system is much simpler and inexpensive than the strobe light system discussed above, the disadvantage exists that these devices are not reusable, and the intensity of the light given off by these devices declines in intensity after only a few hours. This is a considerable disadvantage in some commercial fishing operations, such as gill net fishing, where a net may be left at sea for several days before being retrieved. After the light given off by the glowsticks subsides, the net may be left without an effective light source for a number of days before it is retrieved.

Therefore, prior art fish attracting and repulsion systems suffer from numerous disadvantages which have not yet been overcome.

SUMMARY OF THE INVENTION

The present invention overcomes the above-discussed disadvantages of the prior art by providing a fish attraction and/or repulsion system which utilizes a light source comprising an array of light emitting diodes. Light emitting diodes emit relatively little heat as compared to xenon tube strobe lights, allowing the attraction and/or repulsion system of the present invention to operate without heat monitoring and dissipation means. The simple construction of the system of the present invention, as well as the durability and low cost of light emitting diodes, provides a reusable and durable attraction and/or repulsion system which provides a viable alternative to disposable glowsticks and xenon tube strobe light systems to attract or repel fish in a wide variety of applications.

The fish attracting and/or repelling device according to the present invention includes an array of light emitting diodes which emit light having a wavelength which either attracts or repels fish. The diodes are housed in a water resistant, protective housing which is substantially transparent to the light emitted by the diodes. Electrical power required to illuminate the diodes is transmitted to the diode array from a power supply which may be either internal or remote from the device. In one preferred embodiment of the present invention, the diodes are powered by a rechargeable photovoltaic power supply.

BRIEF DESCRIPTION OF THE DRAWINGS

The invention will now be described, by way of example only, with reference to the following drawings, in which:

FIG. 11 is a schematic representation of how a fish attracting device according to the third preferred embodiment of the present invention could be used in a trawl net application;

DETAILED DESCRIPTION OF PREFERRED EMBODIMENTS

Figure 1:
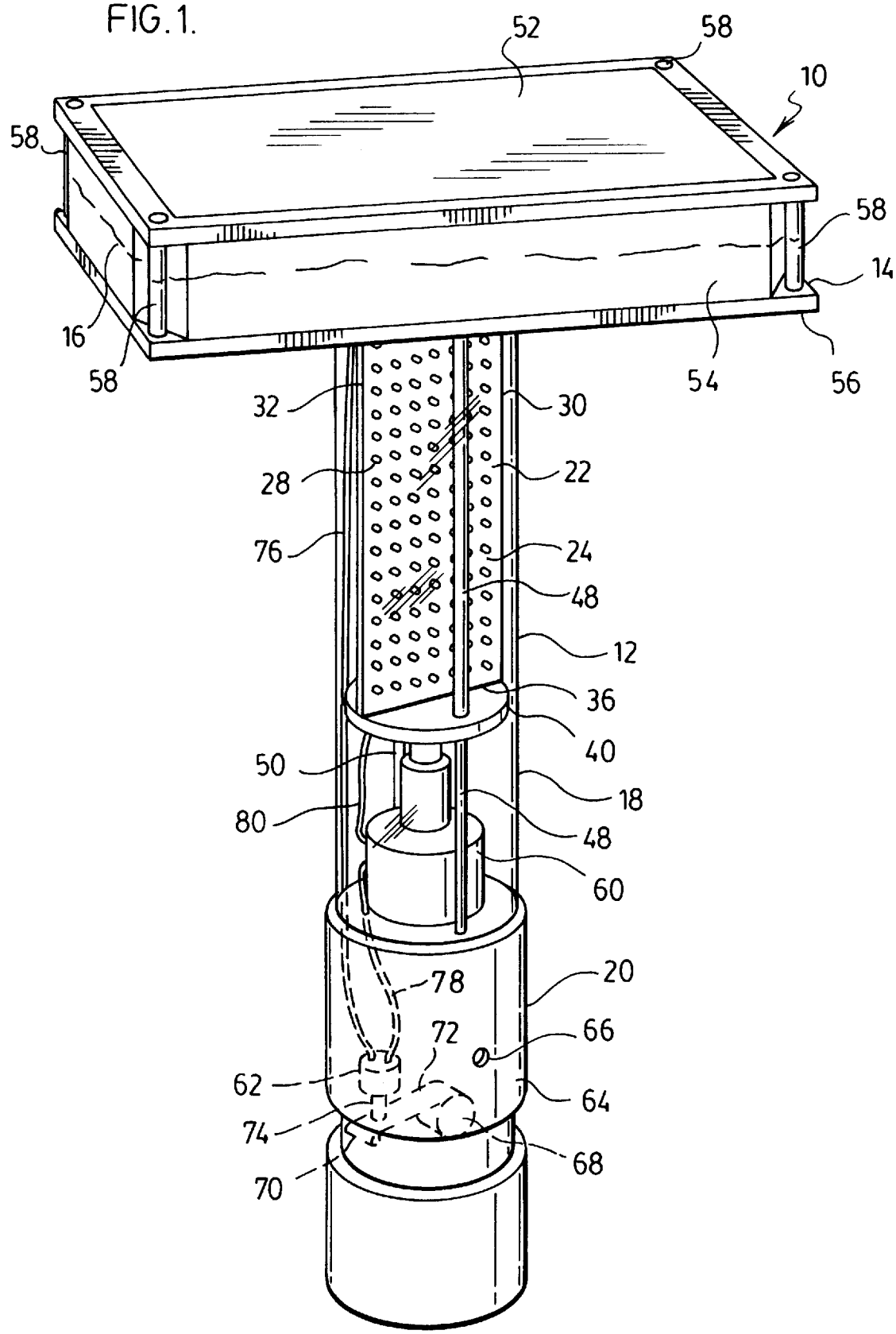
FIG. 1 is a perspective view showing a fish attracting and/or repelling device according to a first preferred embodiment of the present invention.
Figure 2:
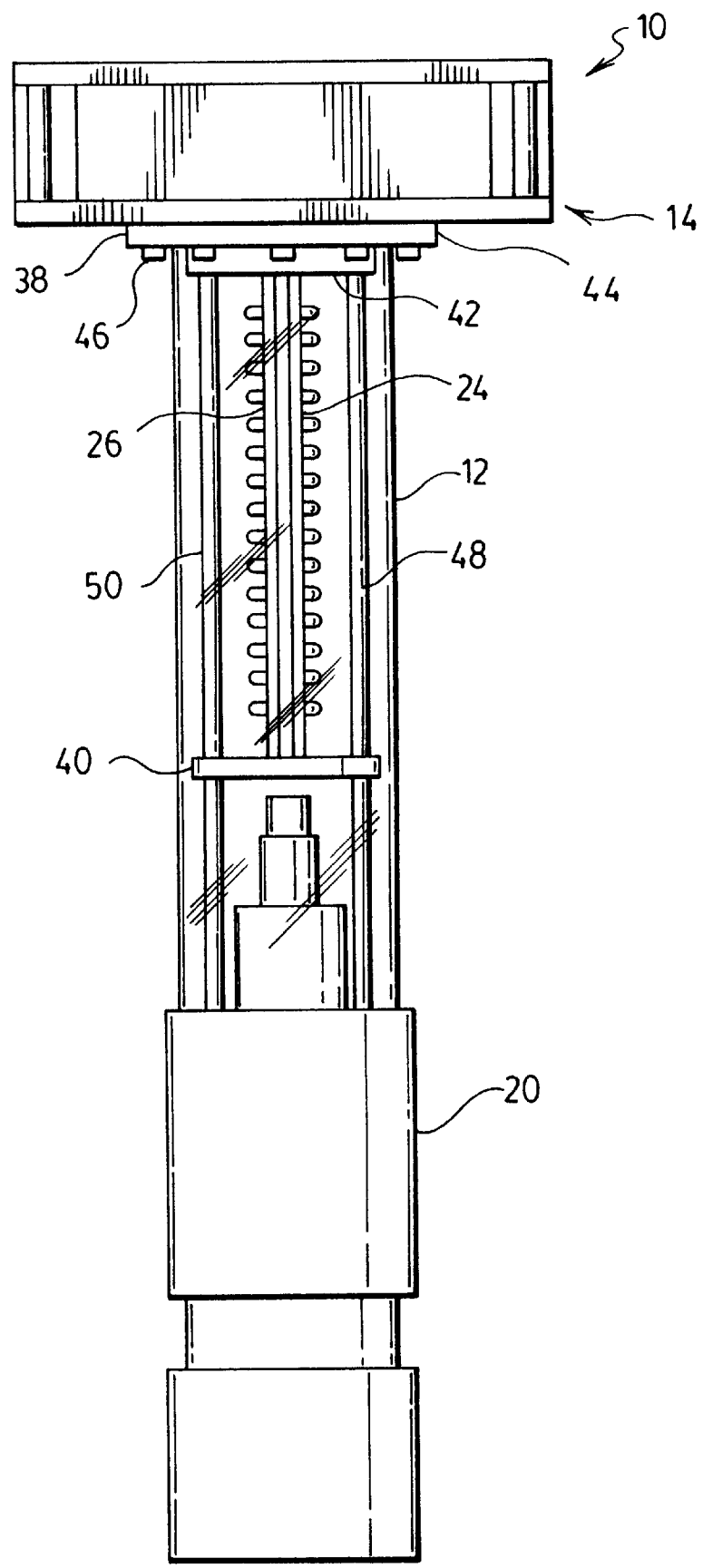
FIG. 2 is a side elevation view of the device shown in FIG. 1.

FIGS. 1 and 2 illustrate a fish repelling and/or attracting device 10 according to a first preferred embodiment of the present invention. Device 10 comprises a cylindrical housing 12 which projects downwardly from a rectangular float 14. When placed in a body of water, device 10 floats with the upper surface of float 14 being exposed above the air/water interface of the body of water, and with the cylindrical housing 12 being completely submerged below the air/water interface. Dotted line 16 represents the approximate position of the air/water interface when device 10 is placed in a body of water.

Cylindrical housing 12 comprises an upper, transparent portion 18 and a lower opaque portion 20 joined together in a water-tight seal. Preferably, both the upper and lower portions 18 and 20 are made of rigid, impact-resistant plastics, with the transparent portion 18 preferably being made from lexan polycarbonate. It is typical for the cylindrical housing to have a length of about 48 inches (122 cm) and an outside diameter of about 8 inches (20 cm).

Received inside upper transparent portion 18 of housing 12 is an array 22 of diodes. Array 22 comprises two circuit boards 24, 26 arranged in back-to-back relation to one another, each circuit board 24, 26 having arranged thereon a plurality of light emitting diodes 28. In the preferred embodiment shown in FIG. 1, each circuit board 24, 26 is provided with 15 rows of diodes, each row containing 7 diodes, with the total number of diodes 28 in each circuit board 24, 26 being 105. It is to be appreciated that any number of diodes 28 may be used, so long as the number of diodes is sufficient to attract or repel fish. Preferably, each circuit board 24, 26 in the array 22 comprises at least about 100 diodes 28, with the upper limit of the number of diodes 28 being limited substantially only by capacity of the power supply. It will be appreciated that the larger the number of diodes, the greater the ability of the device to be seen from a distance, and the greater will be the spacing between adjacent devices. However, as the device according to the first preferred embodiment is preferably powered by a low voltage photovoltaic power supply, the number of diodes 28 in each circuit board 24, 26 preferably does not exceed about 1,000, with the device preferably having an array 22 comprising about two circuit boards 24, 26. Each circuit board in the diode array shown in FIGS. 1 and 2 typically has dimensions of about 9.5 inches (24 cm) by about 4.5 inches (11 cm).

In the device 10 according to the first preferred embodiment, all the light emitting diodes 28 in the array 22 emit light at substantially the same wavelengths. In applications where fish attraction is desired, such as in commercial fishing or aquaculture applications, the light emitting diodes 28 emit short wavelengths of visible light, with the predominant wavelengths of the emitted light being in the blue, green or violet regions of the visible spectrum.

Figure 3:
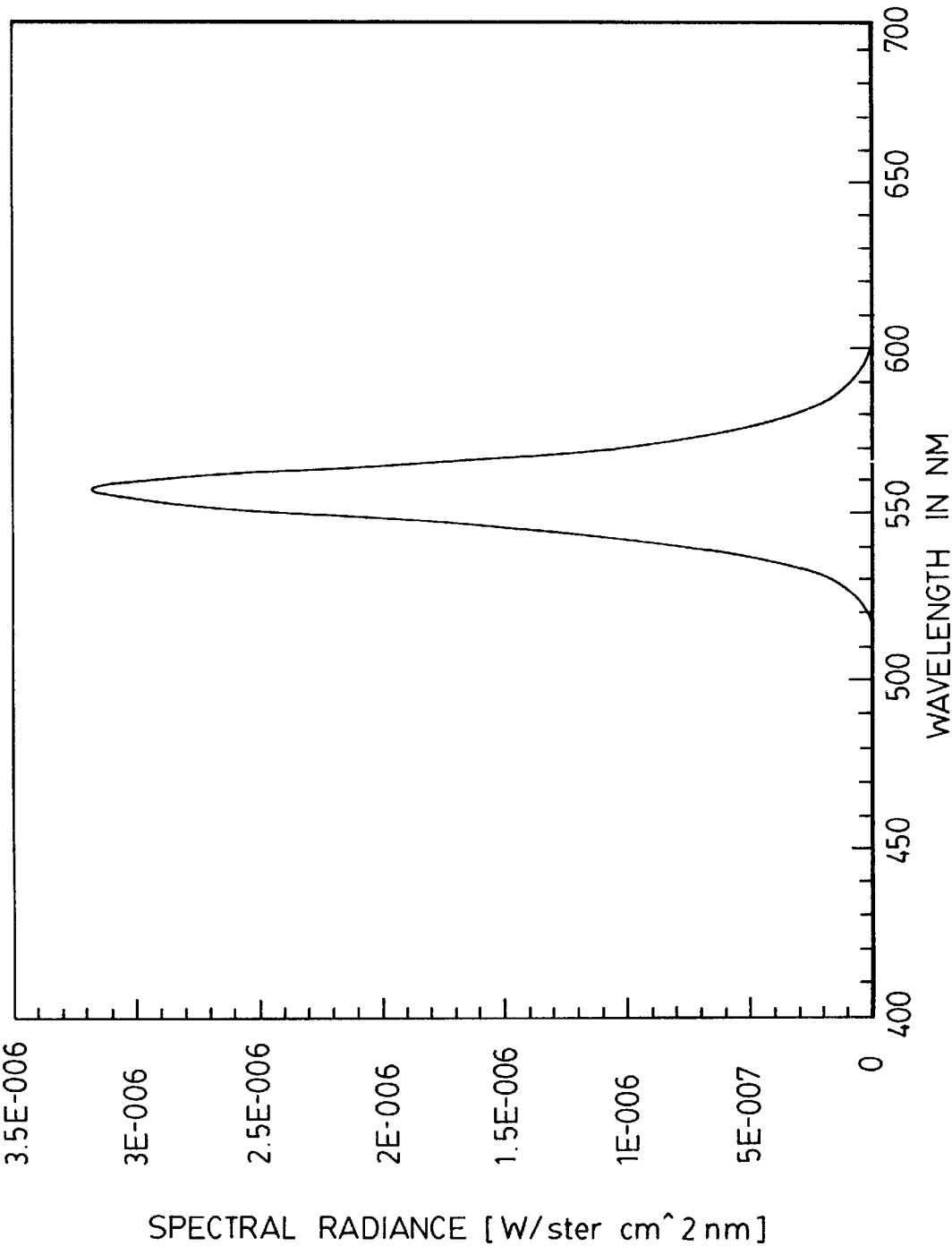
FIG. 3 is a graph of spectral radiance versus wavelength showing the spectral distribution of wavelengths of light given off by green diodes.
Figure 4:
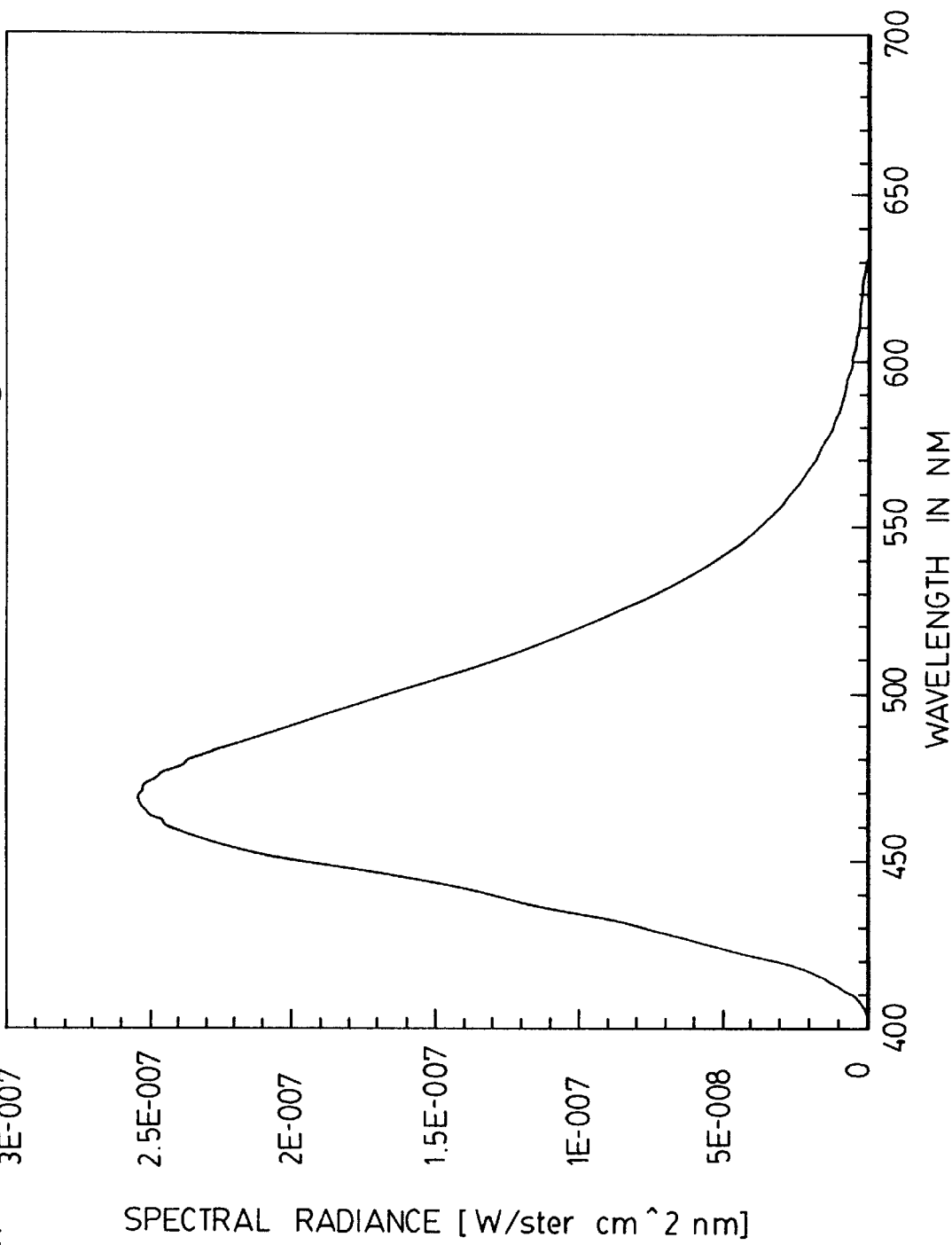
FIG. 4 is a graph of spectral radiance versus wavelength showing the spectral distribution of wavelengths of light given off by blue diodes.
Figure 5:
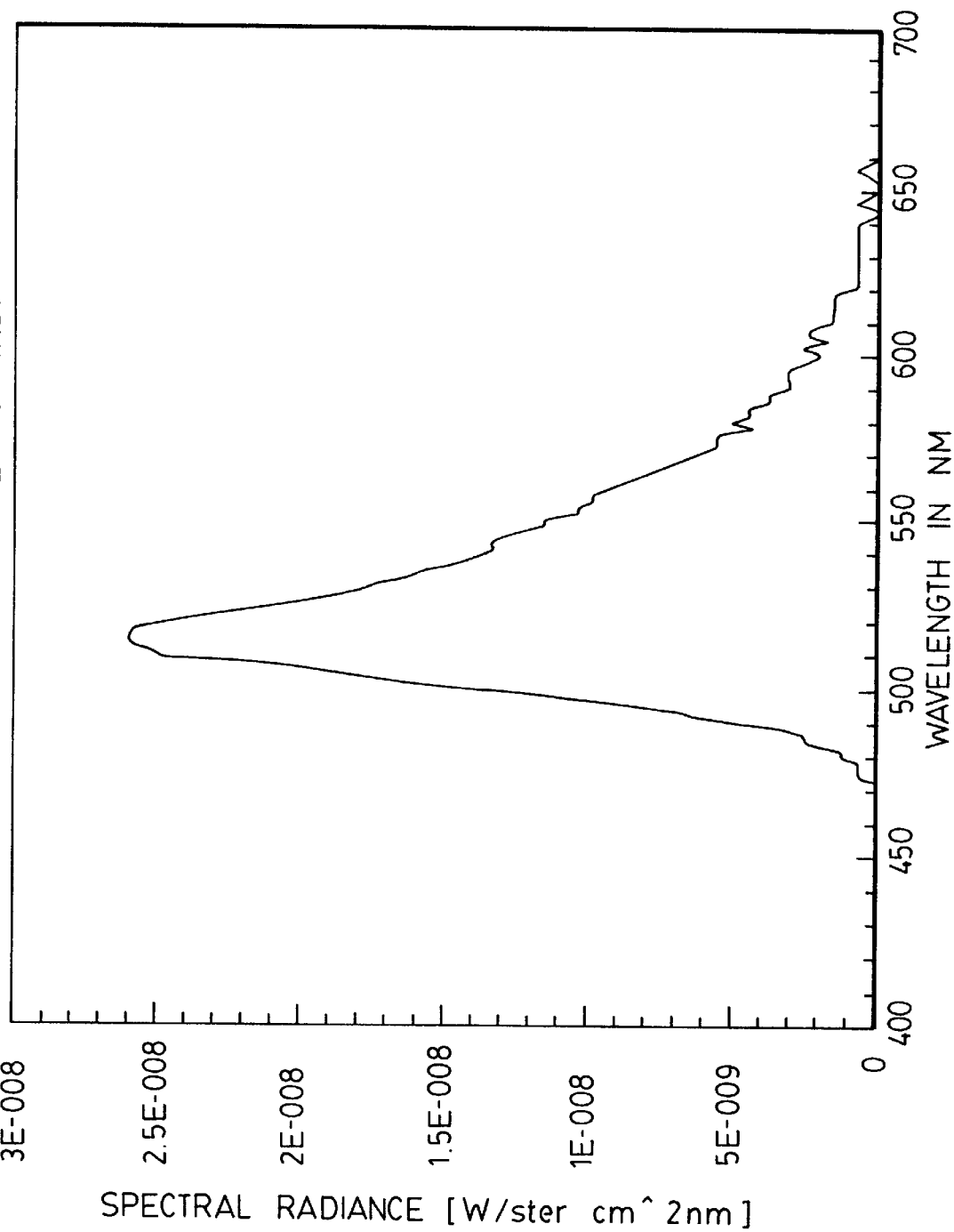
FIG. 5 is a graph of spectral radiance versus wavelength showing the spectral distribution of wavelengths of light given off by a green glowstick.

It will be appreciated that the peak wavelengths of particular diodes are somewhat variable, with blue diodes typically having a peak in the range of from about 420 to about 470 nm, and green diodes having a peak in the range of from about 550 to about 590 nm. The emission spectrum of a typical green diode is shown in FIG. 3, having a single peak at about 560 nm. The emission spectrum of a typical blue diode is shown in FIG. 4, having a single peak at about 468 nm. Diodes emitting light in the green/blue regions of the electromagnetic spectrum have been found to attract numerous fish species. These diodes emit wavelengths similar to those of Duralume "glow sticks" which are commonly used in salt and fresh water fishing. Shown in FIG. 5 is the wavelength distribution of a green Duralume glow stick, approximately five minutes after activation, having a wavelength distribution from about 472 to about 660 nm, with a peak at about 513 nm. Examples of fresh water fish which have been shown to be attracted to green and blue light include walleye, perch and juvenile gizzard shad.

The device according to the first preferred embodiment of the invention may alternatively be used to repel fish, for example to direct the movements of fish away from man-made structures such as water intakes of power plants or the like. In order for the device to function as a repellent, the diodes 28 in the diode array 22 are selected to have wavelengths which repel, rather than attract, certain species of fish. In such applications, diodes 28 are preferably selected which emit visible light having long wavelengths, such as in the red (peak at about 640 to about 680 nm), orange (peak at about 610 to 620 nm) or yellow (peak at about 590 to 600 nm) regions of the visible spectrum.

Referring again to FIGS. 1 and 2, circuit board 24 is retained against movement within the upper transparent portion 18 of housing 12 with its two lateral edges 30 and 32 closely received inside the transparent portion 18 of housing 12, and its upper edge 34 (FIG. 2) and lower edge 36 engaging upper plate 38 (FIG. 2) and lower plate 40, respectively. Circuit board 26 is retained in the same manner.

Upper plate 38 preferably forms an end cap closing the upper end of the housing 12 in a water-tight seal, and preferably also serves as the means by which housing 12 is connected to the float 14. Preferably, upper plate 38 comprises two integrally formed, concentric circular plate members, a smaller plate member 42 having a diameter suitable to be inserted into the upper end of housing 12 and provide a water-tight seal therewith, and a larger plate member 44 having a diameter greater than that of housing 12 and being attached to the underside of float 14. As shown in FIG. 2, upper plate 38 may preferably be attached to float 14 by mechanical fasteners such as bolts 46. However, it will be appreciated that plate 38 may be attached to float 14 by adhesive means or be integrally formed therewith. Lower plate 40 is preferably circular in shape and is closely received inside housing 12, its position being maintained by threaded rods 48 and 50 extending longitudinally through the housing 12 from upper plate 38, through lower plate 40 and preferably into the lower opaque portion 20 of housing 12.

As mentioned above, device 10 according to the first preferred embodiment is preferably provided with a self-contained low voltage photovoltaic power supply which is shown in the drawings as comprising a photovoltaic module 52 mounted on an upper surface of float 14. To provide sufficient power for the diode array 22, the photovoltaic module 52 preferably has dimensions of about 15.6 inches (40 cm) by about 14.7 inches (37 cm), and comprises a plurality of photovoltaic cells of a thin film amorphous silicon type encapsulated in a water-tight polymer material.

In order to maintain the photovoltaic module 52 above the air/water interface when device 10 is placed in a body of water, the float 14 is provided with a block of buoyant material 54 which is sandwiched between the photovoltaic module 52 on its upper side and a plate of rigid plastic 56 on its lower side. In the first preferred embodiment shown in FIGS. 1 and 2, the buoyant material comprises a rectangular block of foamed polystyrene with chamfered corners having a length of about 28 inches (71 cm), a width of about 16 inches (41 cm), and a thickness of about 3 inches (8 cm), and the plate of rigid material comprises a rigid plastic. The photovoltaic module 52 and the rigid plate 56 are secured together at their four corners by threaded fasteners 58, with buoyant material 54 being tightly held between the photovoltaic module 52 and rigid plate 56.

Electricity from the photovoltaic module 52 is stored in a small industrial battery pack 60 mounted in the cylindrical housing 12 of device 10 below lower plate 40. Battery 60 preferably comprises a low voltage, rechargeable nickel cadmium DC battery such as the type commercially available for use in cordless power tools. More preferably, battery 60 is a 12 volt battery. The battery 60 is securely retained in cylindrical housing 12, preferably below the array 22 of light emitting diodes 28, so as to provide ballast to the device 10 and ensure that cylindrical housing 12 maintains its vertical orientation in rough water. Although battery 60 is shown in FIGS. 1 and 2 as being provided in the transparent portion 18 of housing 12, it will be appreciated that the portion of housing 12 in which battery 60 is housed may be opaque.

The lower, opaque portion 20 of housing 12 preferably contains a switch 62 capable of switching the device 10 on and off. As shown in FIG. 1, switch 62 completes a circuit through which electricity flows from photovoltaic module 52 to battery 60, and from battery 60 to the array 22 of diodes. Switch 62 preferably senses when the device 10 is placed in a body of water, turns the device 10 on when placed in water, and switches it off when removed from water. As shown in FIG. 1, the switch 62 is a conventional float switch located inside a switch compartment 64 in the lower portion 20 of housing 12. One or more water intake holes 66 are provided through the wall of switch compartment 64 to allow water to enter the compartment 64 when device 10 is placed in water. The switch 62 preferably includes a float 68 connected to a pivot point 70 through an arm 72. As the switch compartment 64 fills with water, float 68 rises about pivot point 70 until it presses against switch actuator 74, thereby completing the circuit and switching on the device 10.

FIG. 1 illustrates the photovoltaic module 52 being in electrical communication with switch 62 through wire 76 and switch 62 being in electrical communication with battery pack 60 through wire 78. Battery pack 60 supplies power to the array 22 of diodes through a wire 80. It is to be appreciated that FIG. 1 illustrates only one possible electrical circuit through which the components of device 10 are connected, and that other configurations of electrical circuits may be possible without departing from the present invention.

In some preferred embodiments of the present invention, device 10 is provided with means to intermittently interrupt flow of electricity to the diodes 28. Preferably, circuit boards 24, 26 are provided with integrated circuits which cause intermittent flashing of the diodes 28 at a predetermined frequency. The flashing of the diodes 28 may be either in sequence or in unison. The inventors have found that it is particularly preferred for all the diodes 28 of the array 22 to flash in unison with one another, such that the entire array 22 flashes at a predetermined frequency. It has been found by the inventors that a relatively low flash frequency is particularly effective for attracting fish. Preferably, the frequency of flashing is at least about three seconds and is more preferably about four seconds. In other words, each flash cycle of the diode array comprises a period of at least about three seconds in which all the diodes of the array 24 are illuminated, followed by a period of at least three seconds in which none of the diodes 26 in the array are illuminated.

In the first preferred embodiment shown in FIGS. 1 and 2, photovoltaic power supply comprising a 12 volt battery 60 and a photovoltaic module 52 having an area of about 1680 cm$^2$ are sufficient to power the array 22 of diodes comprising two circuit boards 24 and 26, each of which comprise 105 diodes. It has been found that the power consumption of 100 blue diodes operated continuously is about 10 watts, while that of 100 green diodes operated continuously is about 7 watts. It is to be appreciated that the size of the photovoltaic module 52 and the charging capacity and voltage of the battery 60 can be increased or decreased as necessary to accommodate diode arrays having different sizes, and that the photovoltaic power supply described above has a capacity sufficient to allow light emitted by the diodes to maintain a substantially constant intensity over a long period of time. In other words, the capacity of the photovoltaic module and the battery is sufficient so that the battery does not become completely drained during periods of low or no sunlight.

Figure 6:
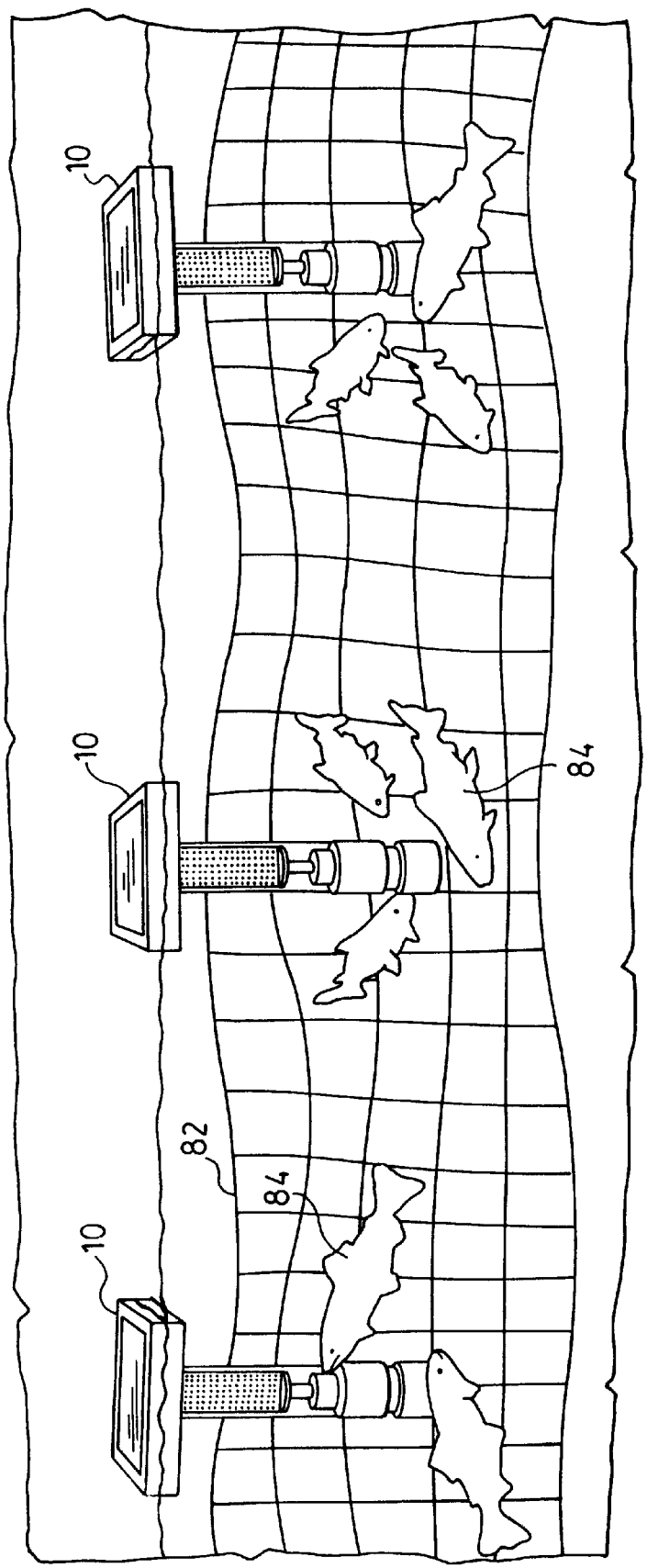
FIG. 6 is a schematic representation of the fish attracting device of FIG. 1 being used in long line, trap net or gill net fishing.

As discussed above, the floating device 10 is preferred for use as a fish attracting device where illumination is desired at or near the surface of a body of water. Such applications include surface netting applications in commercial fishing, including the use of long lines, gill nets and trap nets. Gill nets may have a length of up to about 6 kilometers. As shown in FIG. 6, a plurality of devices 10 are attached to a fishing net 82 at intervals of about 30 m, and attract fish 84 to the net. In commercial fishing applications, the wavelength of light may be selected to attract fish of a target species only, thereby reducing the catch of unwanted species and making commercial fishing more ecologically sound.

Figure 7:
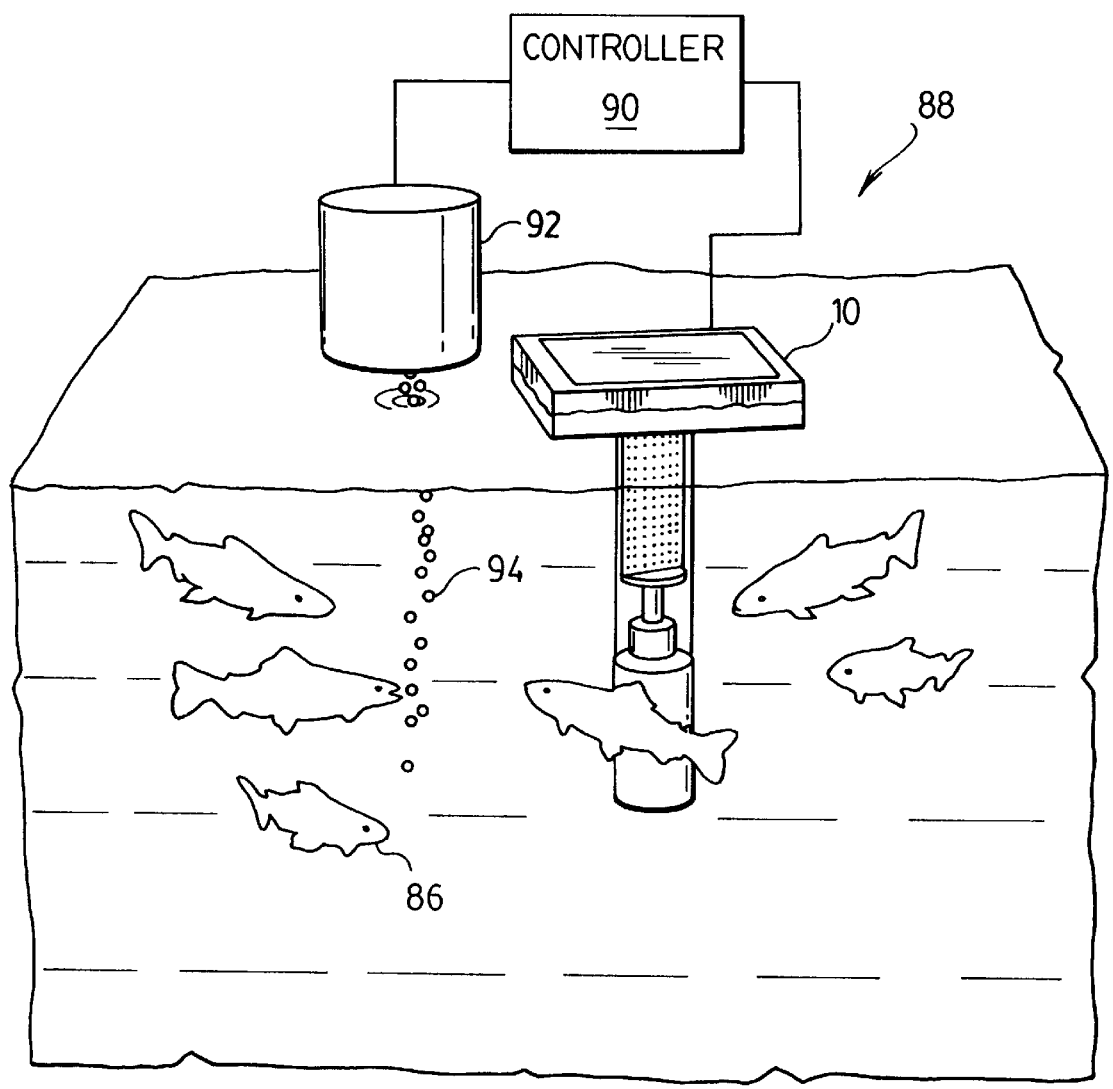
FIG. 7 is a schematic representation of the fish attracting device of FIG. 1 being used in an aquaculture application.

The device 10 according to the first preferred embodiment is also useful in aquaculture applications, such as open sea ranching, in which one or more fish attracting devices 10 are placed at a feeding station located inside an enclosure which typically has a diameter of about 500 m. The device 10 is also useful in smaller aquaculture operations, such as in ponds in which fish are raised or hatched. FIG. 7 illustrates device 10 being used in an aquaculture application in which fish 86 are conditioned to respond to light emitted by device 10 located at a feeding station 88. As schematically shown in FIG. 7, a controller 90 communicates with and controls the operation of both device 10 and a feed dispenser 92. Preferably, controller 90 causes device 10 to be illuminated for periods of about 30 seconds, these periods of illumination being separated by intervals of about 4 hours. During the periods of illumination, controller 90 causes a predetermined amount of food 94 to be dispensed from food dispenser 92 over a period of about 2 seconds. Typically, the dispenser 92 dispenses an amount of food 94 equal to about 2 to 10% of the body weight of each fish per day. The fish 86 become conditioned to respond to the light emitted by device 10 and swim to the feeding station 88 to accept food 94. The inventors have found that this is a highly effective way to feed fish, as it minimizes waste of feed and, when used in hatcheries, may improve the growth and survival of the fry and fingerlings of phototactic fish species such as walleye and perch by allowing them to more readily accept artificial feed. It will be appreciated that for the application shown in FIG. 7, the electrical circuit of device 10 described above may be modified to enable controller 90 to switch device 10 on and off, while allowing photovoltaic module 52 to continue charging battery 60 between feedings.

Figure 8:
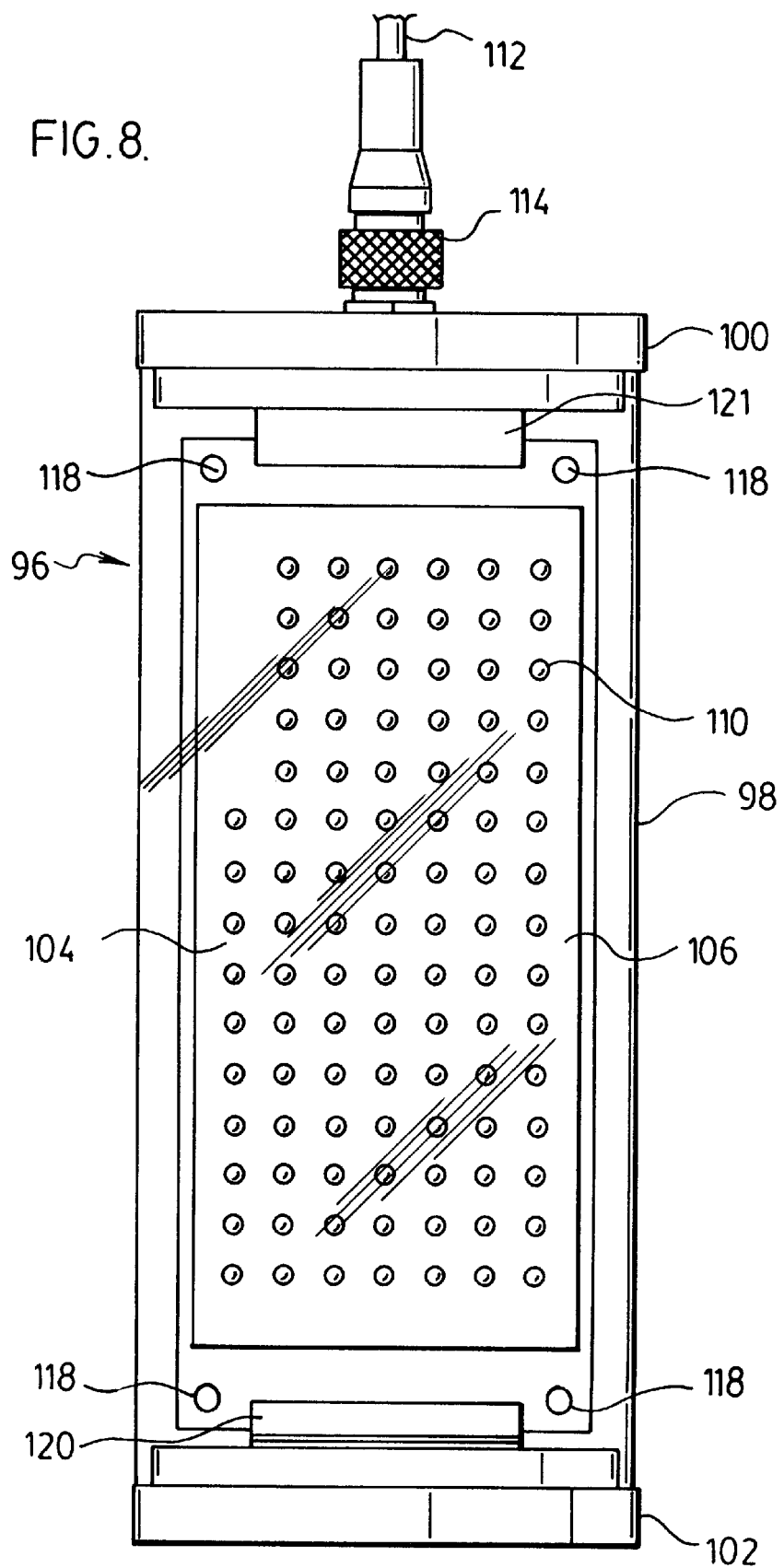
FIG. 8 is a side elevation view of a fish attracting or repelling device according to a second preferred embodiment of the present invention.
Figure 9:
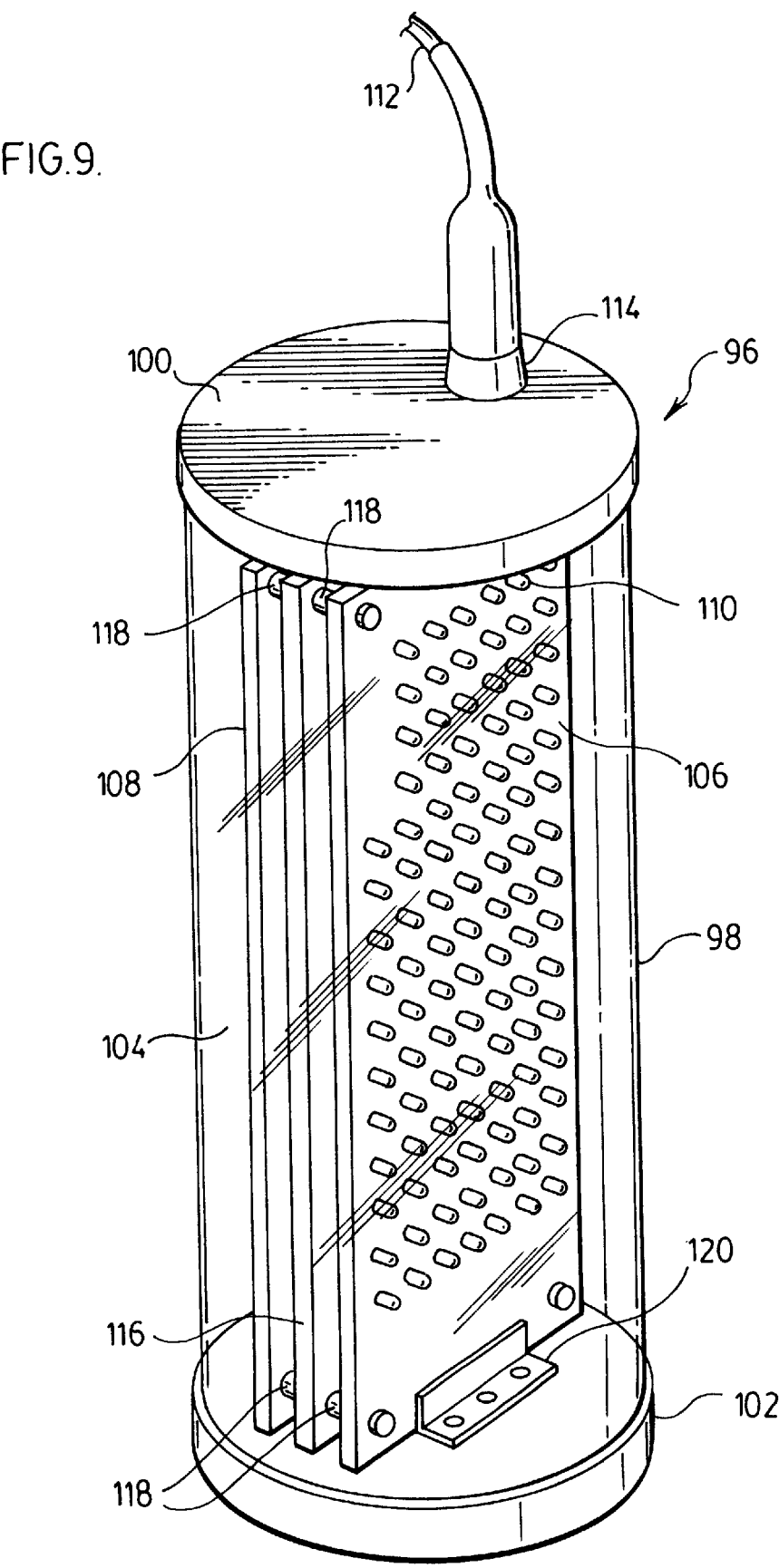
FIG. 9 is a perspective view of the device shown in FIG. 8.

The present invention also provides fish attracting and repelling devices for use in applications where it is desired to completely submerge the device below the surface of a body of water. FIGS. 8 and 9 show a device 96 according to a second preferred embodiment of the invention which may be used in underwater applications such as trawling. The device 96 comprises a cylindrical housing 98 preferably comprised of clear PVC or glass. The housing 98 preferably has a length of about 13 inches (33 cm) and an outside diameter of about 5.5 inches (14 cm). The ends of housing 98 are closed in a water-tight seal by end caps 100 and 102. Retained within housing 98 is an array 104 of light emitting diodes which comprises two flat, rectangular circuit boards 106, 108 arranged in back to back relation to one another, each circuit board 106, 108 having arranged thereon 100 light emitting diodes 110. Each circuit board 106, 108 has 15 horizontal rows of diodes 110, ten of these rows having 7 diodes each and five of these rows having 6 diodes each. As in the first preferred embodiment, the light emitting diodes 110 preferably emit visible light having long wavelengths, most preferably blue or green light.

Since the device 96 is adapted to be submerged to a considerable depth, the housing is preferably resistant to high pressures, and is preferably connected to a remote power supply (not shown) through a power cord 112, which is connected to end cap 100 by a water-tight coupling 114. The power supply may either comprise a 12 volt DC power supply located on a fishing boat to which device 96 is connected through cord 112, or may preferably comprise a floating photovoltaic module, in which case device 96 preferably also contains a rechargeable battery (not shown) such as that of device 10 according to the first preferred embodiment.

In order to prevent loosening of circuit boards 106 and 108, they are preferably both fastened to a central support plate 116 by threaded fasteners 118, one fastener 118 being provided at each corner of the circuit boards 106 and 108. The bottom edge of each circuit board 106 and 108 is preferably rigidly secured to the bottom end cap 102 by a metal angle brackets 120. The top edge of each circuit board 106 and 108 is similarly secured to the top end cap 100 by a metal angle bracket 121.

Figure 10:
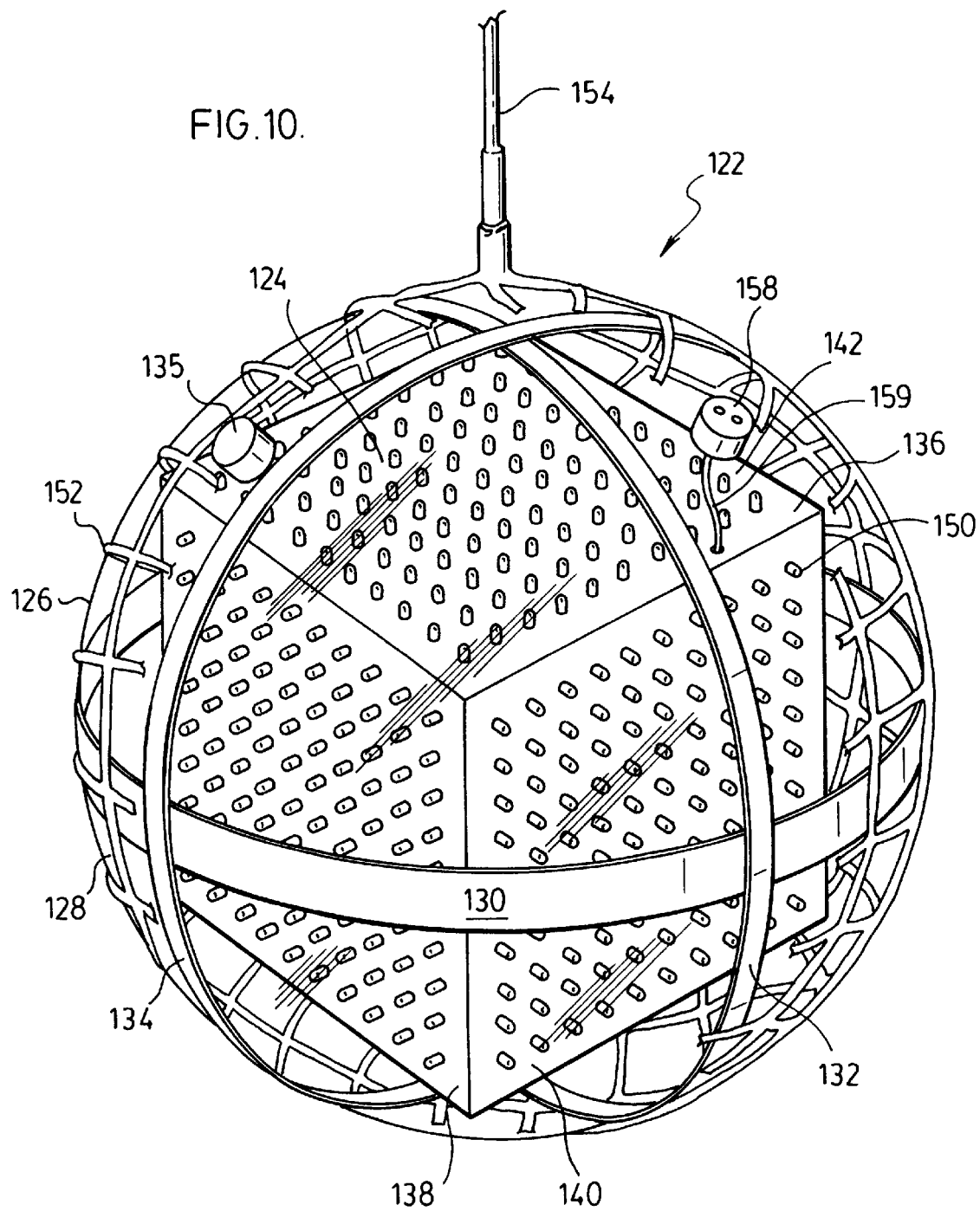
FIG. 10 is a fish attracting or repelling device according to a third preferred embodiment of the present invention.

A third preferred fish attracting device 122 according to the present invention is shown in FIG. 10. Device 122 has a spherical housing 124, comprising two transparent, hemispherical segments 126, 128 which are sealed together at the equator of the sphere, for example by water-resistant vinyl tape 130 applied over a butyl rubber sealant strip. The hemispheres are preferably tightly held together by a pair of gear clamps 132, 134 which are positioned perpendicular to the equator and to each other. The housing 124 is preferably made from glass which is thick enough to withstand depths of up to about 10,000 feet (3,048 m), such as fully annealed low expansion borosilicate glass. The glass housing 124 preferably has an outside diameter of about 10 inches (25 cm) and an inside diameter of about 9.3 inches (24 cm).

The device 122 has a purge plug 135 through which the interior of the housing 124 may be communicated with the exterior, allowing the pressures inside and outside housing 124 to be balanced. The housing 124 contains an array 136 of light emitting diodes which is substantially cubic in shape, having 6 sides, each side comprising a square circuit board 138, 140, 142, 144, 146 and 148 having arranged thereon 100 light emitting diodes 150 in ten rows of ten. As in the first and second preferred embodiments, the diodes 150 preferably emit visible light of relatively short wavelength, more preferably blue or green light. Device 122 is preferably enclosed in a sturdy mesh bag 152 comprised of water resistant cords, for example made from nylon or polypropylene. The mesh bag 152 is connected to an underwater structure such as a trawling net by a cord 154 which is attached to a point on mesh bag 152. Preferably, mesh bag 152 has an expandable opening through which the device 122 may be removed.

Preferably, power is supplied to the diode array 136 by a rechargeable battery 156 (not shown) located in the cubic space enclosed by circuit boards 138 to 148. The battery 156 is preferably a rechargeable gelled sealed lead acid battery having a capacity of 10 amp/hour @ 12 V DC. A charging plug 158 is provided in the housing 124 through which the battery 156 may be charged. Wire 159 is shown extending from plug 158 to the space inside array 136 where battery 156 is located.

FIG. 11 illustrates a plurality of devices 122 attached to a trawling net 160 which is attached through lines 162, 164 to a fishing boat 166. A total of nine devices 122 are mounted on the mouth of trawling net 160 which is being pulled by boat 166 toward a school of fish 168. Trawling nets are typically deployed at a depth of about 700 to 800 fathoms and pulled through the water by a fishing boat moving at a speed at about 3.5 to 4 knots. One problem with conventional trawling net is that when the movement of the approaching net is detected by a school of fish, some of the fish respond by moving over or under the net to avoid being caught. The submersible fish attracting device 122 overcomes this problem by attracting the fish 168 to the net 160 such that they either attempt to avoid the net too late or not at all, and therefore become trapped in the net. It will be appreciated that the fish attracting device 96 according to the second preferred embodiment of the invention may also be attached to a trawling net in the manner shown in FIG. 12.

Due to the fact that light emitting diodes generate very little heat, the fish attracting and repelling devices according to the present invention do not require means to monitor and dissipate heat as in systems employing high intensity, high heat generating strobe lights. Therefore, the fish attracting and repelling devices according to the present invention are comparatively simple in construction, and inexpensive relative to strobe light systems. Furthermore, diodes are very long lasting, and typically have a lifetime of about 10 years. Therefore, the fish attracting and repelling devices according to the present invention have a very long lifetime, which reduces their long term cost and makes them competitive with disposable systems such as chemically activated glow sticks.

Although the invention has been described in relation to certain preferred embodiments, it is to be understood that the invention is not restricted thereto. Rather, the invention includes all embodiments which may fall within the scope of the following claims.

What is claimed is:

1. A device for attracting or repelling fish, comprising:
   (a) an array of light emitting diodes, each of which emits visible light having wavelength peaks in the range of from about 400 to about 700 nm;
   (b) a water resistant, protective housing in which said diode array is retained, said housing being substantially transparent to said visible light emitted by said array of diodes; and
   (c) electrical power transmitting means for transmitting electrical power to said array of diodes,
   wherein said array of light emitting diodes is multi-faceted so that the device emits light in more than one direction, and each facet of said array comprises from about 100 to about 1000 light emitting diodes.

2. A fish attracting device according to claim 1, wherein said device is adapted to float in a body of water having an air/water interface, with a first portion of said device including said housing and said array of diodes adapted to extend below the interface, and a second portion of said device including a float and being adapted to extend above the interface;
   wherein said housing is elongate and has a lower end and an upper end, the lower end being provided with a weight, and the upper end connected to said float, such that said housing maintains a vertical orientation in said body of water.

3. A fish attracting device according to claim 2, further comprising a self-contained photovoltaic power supply connected by said electrical power transmitting means to said array of diodes, wherein said power supply comprises a rechargeable battery retained in the lower end of said housing, said battery also serving as said weight, and wherein said battery is charged by a photovoltaic module provided on an upper surface of said float, said photovoltaic module and said battery having capacity sufficient to allow said light emitted by said diodes to maintain a substantially constant intensity.

4. A fish attracting device according to claim 1, wherein said array of diodes has two facets arranged in opposite directions to one another, each of said facets comprising about 100 light emitting diodes.

5. A fish attracting device according to claim 1, wherein said housing is spherical and said array of diodes is substantially cubic having six facets, said device adapted to sink in a body of water, and wherein said electrical power transmitting means connects said device to a remote power supply.

6. A fish attracting device according to claim 5, wherein each of said facets comprises about 100 light emitting diodes.

7. A device for attracting or repelling fish, comprising:

(a) an array of light emitting diodes, each of which emits visible light having wavelength peaks in the range of from about 400 to about 700 nm;

(b) a water resistant, protective housing in which said diode array is retained, said housing being substantially transparent to said visible light emitted by said array of diodes; and (c) electrical power transmitting means for transmitting electrical power to said array of diodes;

wherein said device emits visible light having a peak intensity at a wavelength of from about 420 nm to about 470 nm.

8. A fish attracting device according to claim 1, wherein said device emits visible light having a peak intensity at a wavelength of from about 550 to about 590 nm.

9. A device for attracting or repelling fish, comprising:

(a) an array of light emitting diodes, each of which emits visible light having wavelength peaks in the range of from about 400 to about 700 nm;

(b) a water resistant, protective housing in which said diode array is retained, said housing being substantially transparent to said visible light emitted by said array of diodes;

(c) electrical power transmitting means for transmitting electrical power to said array of diodes; and (d) flash generating means adapted to intermittently interrupt flow of electrical power to said array of diodes, such that said array of diodes flashes at a predetermined frequency, wherein said predetermined frequency is greater than about one flash per second.

10. A fish attracting device according to claim 9, wherein said predetermined frequency is greater than about one flash per three seconds.

11. A fish attracting device according to claim 10, wherein said predetermined frequency is about one flash per four seconds.

* * * * *